United States Patent [19]

Mochizuki et al.

[11] Patent Number: 4,696,446
[45] Date of Patent: Sep. 29, 1987

[54] SYSTEM FOR DETECTING FLAT PORTION OF PERIPHERAL SURFACE OF VEHICLE WHEEL

[75] Inventors: Asahi Mochizuki, Yokohama; Kira Ozawa, Mie; Shinichiro Fujita; Kuniaki Yamada, both of Tokyo, all of Japan

[73] Assignees: Shinko Electric Co. Ltd.; Japanese National Railways, both of Tokyo, Japan

[21] Appl. No.: 591,535

[22] Filed: Mar. 20, 1984

[30] Foreign Application Priority Data

Apr. 7, 1983 [JP] Japan .................................. 58-61472

[51] Int. Cl.4 ........................ B61L 1/20; B61K 13/00
[52] U.S. Cl. .............................. 246/169 S; 246/169 R
[58] Field of Search ............. 246/1 R, 77, 121, 169 R, 246/169 S, 247, 249, 246

[56] References Cited

U.S. PATENT DOCUMENTS 2,831,965  4/1958  Walker ............................. 246/169 R
3,558,876  1/1971  Douglaston ....................... 246/169 S
3,844,513  10/1974  BErnardson ....................... 246/249
4,058,279  11/1977  Frielinghaus ................... 246/169 R
4,129,276  12/1978  Svet ................................ 246/169 S Primary Examiner—John W. Caldwell, Sr.
Assistant Examiner—Alvin Oberley
Attorney, Agent, or Firm—Scully, Scott, Murphy & Presser

[57] ABSTRACT

There is disclosed a system for detecting a flat portion of a peripheral surface of a vehicle wheel disposed in rolling engagement with a track rail. A detecting device is provided for detecting one of acceleration representative of vibration of the wheel, stress developing in a support member connected to the wheel, and a noise produced by the rolling of the wheel on the rail to produce a first detection signal in response to a predetermined angular movement of the wheel. A device is provided for determining whether the first detection signal is above a predetermined reference level to produce a second detection signal in synchronism with the rotation of the wheel and indicative of a wheel flat portion of above a predetermined length.

1 Claim, 6 Drawing Figures

SYSTEM FOR DETECTING FLAT PORTION OF PERIPHERAL SURFACE OF VEHICLE WHEEL

BACKGROUND OF THE INVENTION

1. Field of the Invention

This invention relates to a system for detecting a flat portion of a peripheral surface of a vehicle wheel disposed in rolling engagement with a track rail.

2. Prior Art

When a railway vehicle or the like is braked intensely, a rotational speed of the braked wheel becomes lower than the speed of running of the vehicle, so that the braked wheel slides over the rail. When this sliding is excessive, the braked wheel is often prevented from rotating during the running of the vehicle. This phenomenon is commonly referred to as "adhesion" in the trade. As a result, a portion of the peripheral surface of the braked wheel is subjected to wear due to the friction between the braked wheel and the rail with which it is disposed in rolling engagement, thereby producing a flat portion on the peripheral surface of the braked wheel. When such a flat portion develops on the peripheral surface of the wheel, naturally the wheel can not be rotated smoothly, and this gives a rough ride. And, in some cases, a chassis of the vehicle may be subjected to damage. Further, noises caused by the flat portion of the rotating wheel may constitute a factor for a noise pollution. Generally, in order to overcome this difficulty, a railway train has heretofore been equipped with a detector for detecting the sliding of a wheel. When the detector detects the sliding of the wheel over the rail, the braking of the wheel is weakened so as to prevent the above-mentioned adhesion. Actually, however, even if the braking is weakened when the sliding of the wheel is detected, the adhesion may still develop when the friction between the wheel and the rail is low because the residual pressure of an associated braking device still applies a braking action to the wheel. Thus, the formation of the flat portion on the wheel can not be eliminated satisfactorily.

SUMMARY OF THE INVENTION

It is therefore an object of this invention to provide a system for detecting a flat portion of a peripheral surface of a vehicle wheel disposed in rolling engagement with a rail, thereby preventing damage to the vehicle and the generation of noises.

According to the present invention, there is provided a system for detecting a flat portion of a peripheral surface of a vehicle wheel disposed in rolling engagement with a track rail, which system comprises means for detecting one of acceleration representative of vibration of the wheel, stress developing in a support member connected to the wheel, and a noise produced by the rolling of the wheel on the rail to produce a first detection signal in response to a predetermined angular movement of the wheel; and means for determining whether the first detection signal is above a predetermined reference level to produce a second detection signal in synchronism with the rotation of the wheel and indicative of a wheel flat portion of above a predetermined length.

DESCRIPTION OF THE PREFERRED EMBODIMENTS OF THE INVENTION

Figure 1:
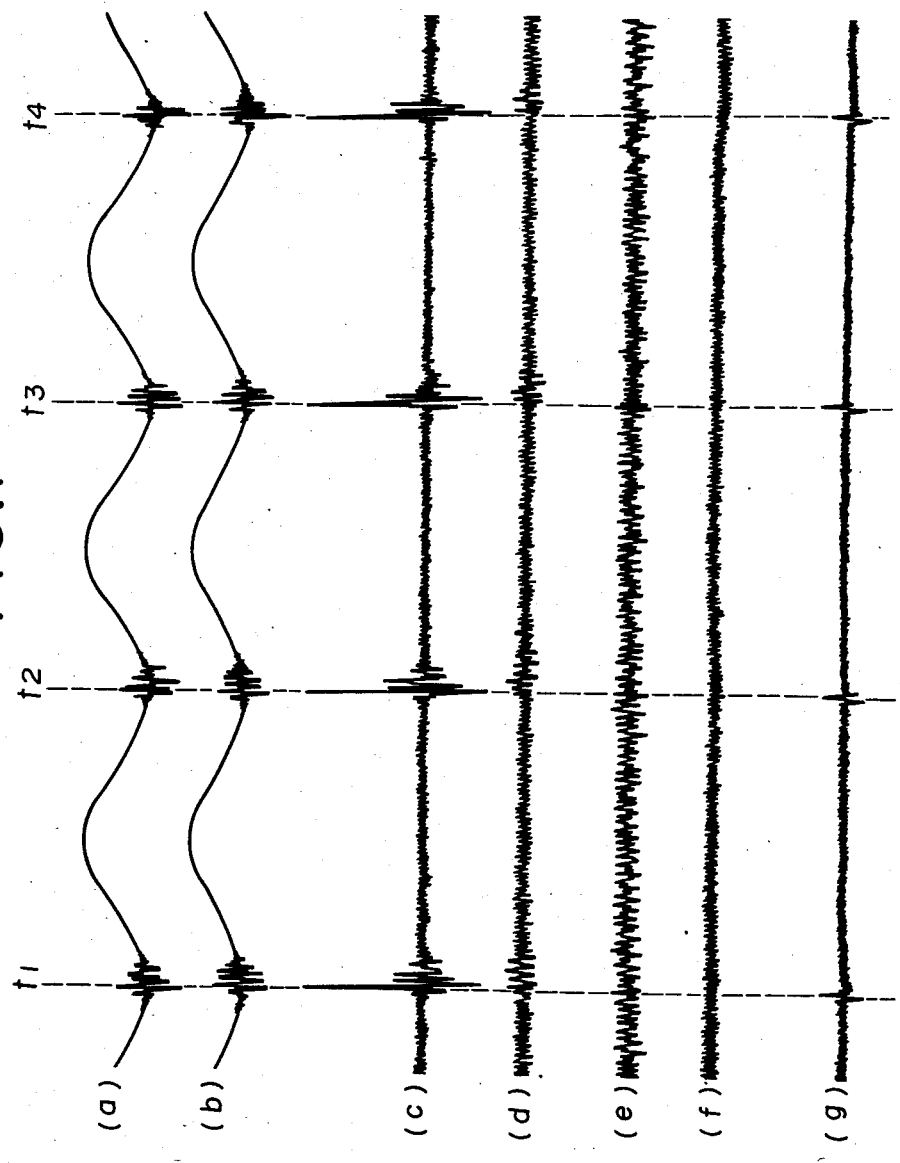
FIG. 1 is a diagrammatic illustration showing accelerations and stresses during rotations of a train wheel having a flat portion.

The principles of the present invention will be first described with reference to FIG. 1. When a flat portion on a peripheral surface of a wheel of a train is brought into contact with a track rail at time t1, t2 and so on during the travel of the train, bending stresses (a) and (b) developing respectively at two points of an axle supporting a pair of wheels of the train, acceleration (c) developing at the top surface of a journal box supporting one end of the axle and disposed adjacent to the wheel having the flat portion, acceleration (d) developing at the top surface of a journal box supporting the other end of the axle and disposed adjacent to the wheel having no flat portion, stress (e) developing in a beam mounted on a chassis of the train and disposed adjacent to the wheel having the flat portion, stress (f) developing in a beam mounted on the chassis and disposed adjacent to the wheel having no flat portion, and the rotation of the axle (g) varies as shown in FIG. 1. Thus, when the flat portion of the wheel contacts the rail, the acceleration representative of vibration and the bending stresses are abruptly varied. In the present invention, the flat portion of the wheel is detected making use of such abrupt change in acceleration, bending stress or noises.

Figure 2:
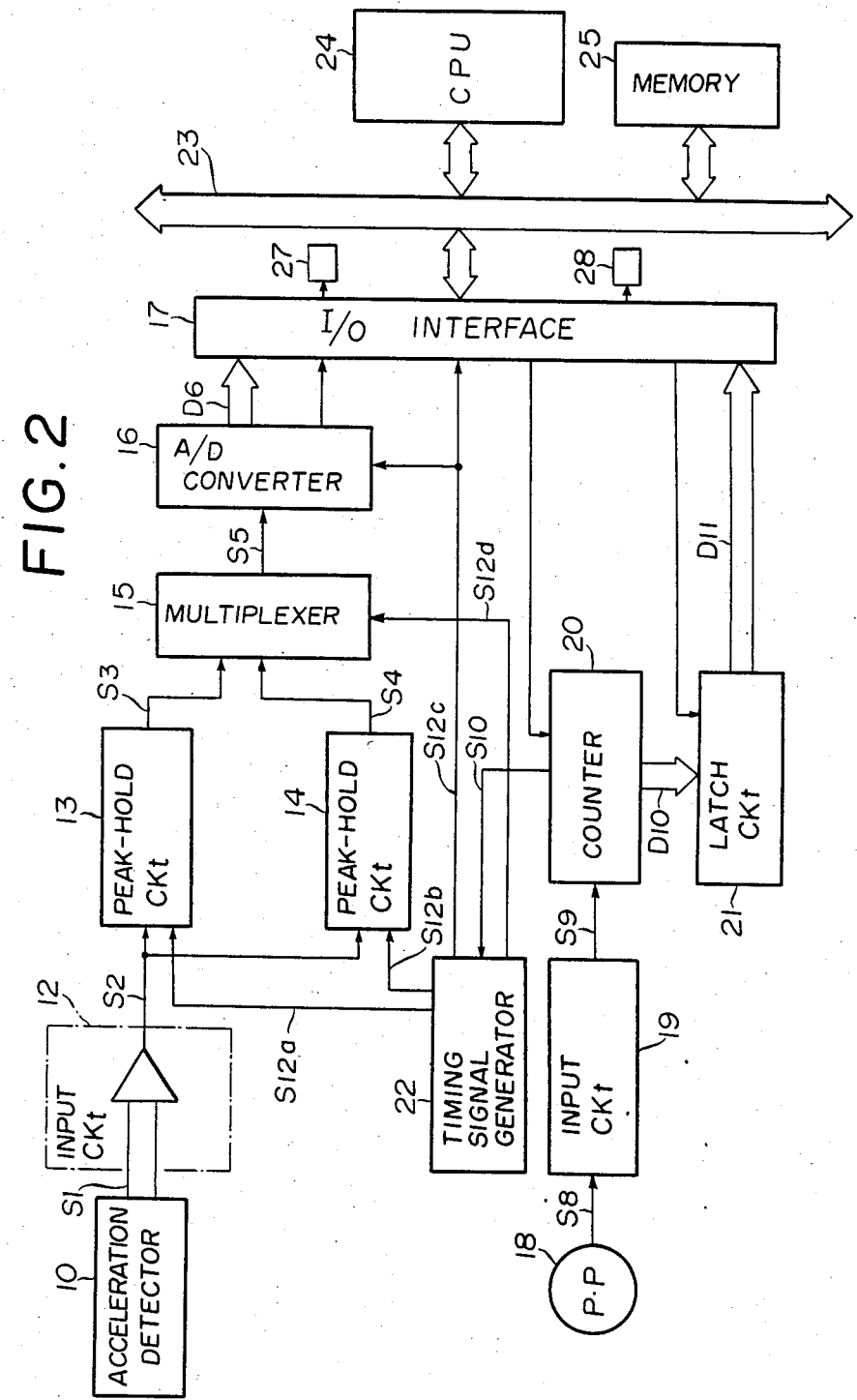
FIG. 2 is a block diagram of a flat portion detecting system provided in accordance with the present invention.
Figure 3:
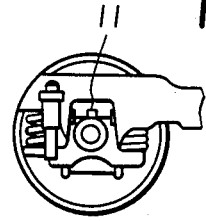
FIG. 3 is an elevational view of a portion of a train incorporating the system.

FIG. 2 is a block diagram of a system for detecting a flat portion of a peripheral surface of a train wheel disposed in rolling engagement with a rail. An acceleration detector 10 is mounted as shown at 11 in FIG. 3 on a top surface of a journal box of the wheel W for detecting an acceleration thereof which represents vibration. An output signal S1 of the acceleration detector 10 is amplified by an input circuit 12 and applied to first and second peak-hold circuits 13 and 14. The first and second peak-hold circuits 13 and 14 are rendered operative in overlapping relation, so that they hold the peak of an output signal S2 of the input circuit 12. The output signal S3 of the peak-hold circuit 13 and the output signal S4 of the peak-hold circuit 14, each representative of the peak of the output signal S2, are applied to a multiplexer 15 in overlapping relation. An output signal S5 of the multiplexer 15 is converted into a digital data D6 through an analogue-to-digital converter 16 which digital data is applied to an I/O interface 17. A speed detector 18 serves to detect the rotation of the wheel and is, for example, in the form of a pulse pickup. An output signal S8 of the speed detector 18 is subjected to waveform shaping through a second input circuit 19 and applied to a counter 20, the counter 20 functioning to count up output signals S9 of the second input circuit 19 applied thereto. An output data D10 of the counter 20, representative of the counting-up of the output signals S9, is applied to a latch circuit 21 which outputs data D11 to the I/O interface 17. The counter 20 is also responsive to the output signal S9 of the second input circuit 19 for outputting a signal S10 to a timing signal generator 22. The timing signal generator 22 outputs timing signals S12a, S12b, S12c and S12d in accordance with the output signal S10 of the counter 20. The timing signals S12a to S12d are used for controlling the peak-hold circuit 13, the peak-hold circuit 14, the I/O interface 17 and the multiplexer 15, respectively.

The I/O interface 17 functions to input the output data D6 of the analogue-to-digital converter 16 and the output data D11 of the latch circuit 21 thereto. The output data of the I/O interface 17 is applied to a central processing unit 24 (hereinafter referred to as "CPU") through a data bus 23. The data inputted to the CPU 24 is stored in a memory 25 through the data bus 23.

Figure 4:
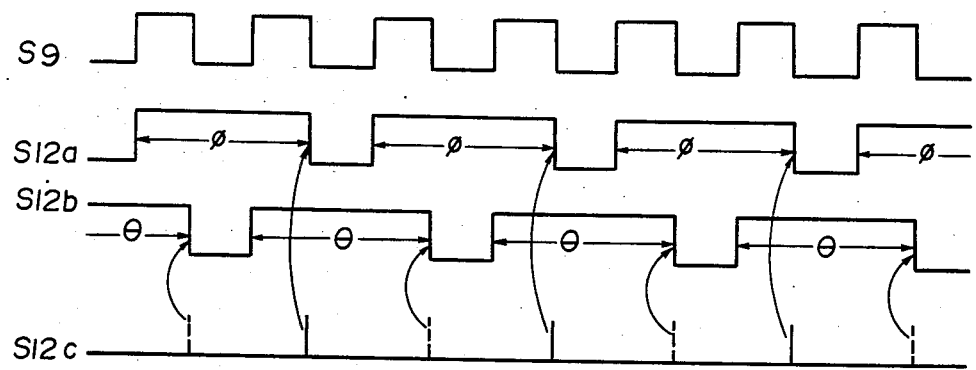
FIG. 4 is a time chart for signals used in the system.
Figure 5:
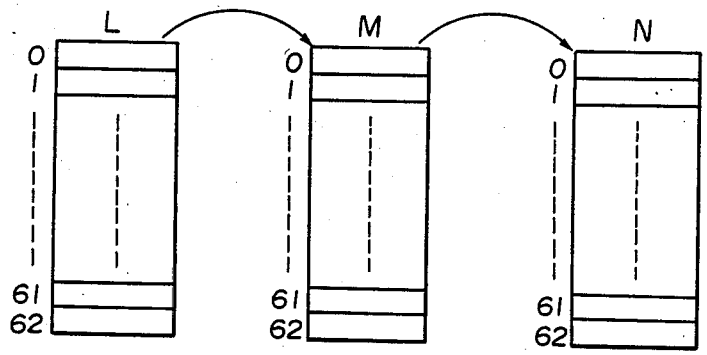
FIG. 5 is an illustration showing a memory incorporated in the system.

The operation of the flat portion detecting system will now be described with reference to FIGS. 4 and 5. When the wheel W is being rotated, the speed detector 18 outputs the signal S8 representative of the rotational speed of the wheel. The output signal S9 of the second input circuit 19, corresponding to the detected rotational speed of the wheel, is applied to the counter 20, so that the counter 20 outputs the signal S10 to the timing signal generator 22. The timing signal generator 22 is responsive to the output signal S10 of the counter 20 to feed the timing signals S12a to S12d. The first peak-hold circuit 13 is rendered operative during a period P1 in response to the timing signal S12a, this peak-hold circuit 13 being rendered operative at time intervals as shown in FIG. 4. Similarly, the second peak-hold circuit 14 is rendered operative during a period P2 in response to the timing signal S12b, this peak-hold circuit 14 being rendered operative at time intervals as shown in FIG. 4. As shown in FIG. 4, the first and second peak-hold circuits 13 and 14 are rendered operative in overlapping relation. The output signals S3 and S4 of the first and second peak-hold circuits 13 and 14, each representative of the peak of the acceleration of the journal box carrying the wheel, are applied to the multiplexer 15. The multiplexer 15 selects the output signals S3 and S4 alternately in response to the timing signal S12d and outputs the signal S5 to the analogue-to-digital converter 16. The analogue-to-digital converter 16 outputs the data D6 to the I/O interface 17 in response to the timing signal S12c (see FIG. 4). The counter 20 also counts up the pulses of the output signal S9 of the second input circuit 19 and outputs the data D10, representative of the result of this counting-up, to the latch circuit 21. The latch circuit 21 outputs the data representative of this counting-up result to the I/O interface 17.

The speed detector 18 is designed to feed 63 pulses per revolution of the wheel W of the train. When the rotational speed of the wheel reaches a predetermined level, the CPU 24 inputs the output data D6 of the analogue-to-digital converter 16 and the output data D11 of the latch circuit 21 thereto through the I/O interface 17. The data D11 are used as address data, and in accordance with these address data D11, the data D6 representative of the acceleration of the wheel W are sequentially written into the memory 25. For example, the acceleration data D6, outputted from the analogue-to-digital converter 16 when the speed detector 18 feeds a first pulse after the speed of the train reaches the predetermined level of 10 km/h, is written into address 0 of area L of the memory 25 (FIG. 5). Subsequently, the data, corresponding respectively to second to sixty-third pulses fed from the speed detector 18, are sequentially written into addresses 1 to 62 of the area L, respectively. Upon completion of the writing of the acceleration data D6 during a first revolution of the wheel, the data stored in the addresses 0 to 62 of the area L are shifted to addresses 0 to 62 of area M of the memory 25, respectively, under the control of the CPU 24. In this manner, the acceleration data D6 during a second revolution of the wheel are sequentially written into the addresses 0 to 62 of the area L of the memory 25, respectively. When the second revolution of the wheel is completed, the data stored in the addresses 0 to 62 of the area M are shifted to addresses 0 to 62 of area N of the memory 25, respectively, and the data stored in the addresses 0 to 62 of the area L are shifted to the addresses 0 to 62 of the area M, respectively. Further, the acceleration data D6 during a third revolution of the wheel are sequentially written into the addresses 0 to 62 of the area L in the above-mentioned manner. The CPU 24 operates to determine whether the acceleration data stored in the address 0 of the area L increases abruptly from the immediately-preceding acceleration data, that is, the acceleration data stored in the address 62 of the area M and also to determine whether a difference among three acceleration data stored respectively in the addresses 0 of the areas L, M and N is below a predetermined reference level. In this manner, the acceleration data stored in each address of the area L is checked to determine whether it abruptly varies from the immediately-preceding acceleration data, and at the same time three acceleration data stored respectively in each three corresponding addresses of the areas L, M and N are compared with one another to determine whether a difference among them is below the predetermined reference level. When the acceleration data stored in any address of the area L abruptly increases from that stored in the immediately-preceding address, and when a difference among the three acceleration data stored respectively in the three corresponding addresses of the areas L, M and N, is below the predetermined reference level, the CPU 24 outputs a flat detection signal to an associated circuit 27.

Even where the wheel W does not have any flat portion on its peripheral surface, the acceleration also abruptly increases when the wheel passes through the joint between the rails. This is the reason why the flat detection signal is not fed when a difference among the three acceleration data stored in the three corresponding addresses of the areas L, M and N is above the predetermined reference level. In this way, when a flat portion develops on the peripheral surface of the wheel, it can suitably be detected.

Figure 6:
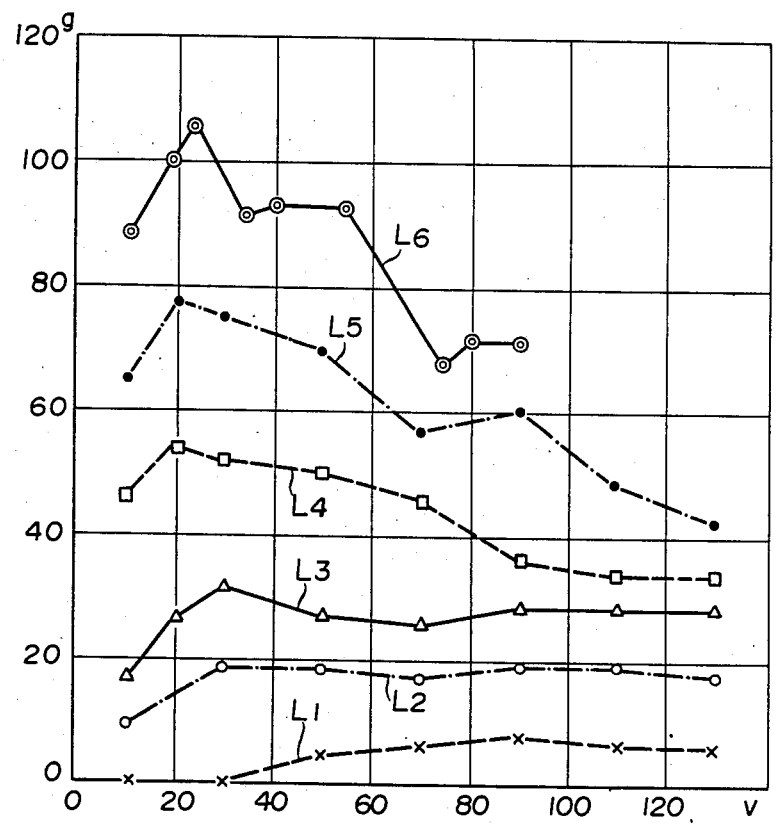
FIG. 6 is a graph showing the relation between the acceleration and the speed of a train.

The acceleration g is varied in accordance with the speed v of the train and the length of the flat portion on the peripheral surface of the wheel W of the train, as shown in FIG. 6. When the length of the flat portion is varied on the order of 15 mm, 30 mm, 45 mm, 60 mm and 75 mm, the acceleration g is varied as indicated by lines L2, L3, L4, L5 and L6, respectively, in FIG. 6. Line L1 in FIG. 6 indicates the acceleration g when no flat portion is formed on the peripheral surface of the wheel. As can be seen from FIG. 6, when the speed v of the train is in a specific range, for example, in the range of 10 to 50 km/h, the acceleration g is generally proportional to the length of the flat portion of the wheel.

Therefore, the length of the flat portion can be approximately determined by the acceleration g involved.

The memory 25 also stores in another area flat length data representative of the length of a flat portion of the wheel determined by the acceleration of the wheel. In this case, the flat length data is stored in the memory 25 in the form of data in which various flat length data are listed in terms of acceleration of the wheel. As described above with reference to FIG. 6, such data representing the relation between the acceleration of the wheel and the flat length can be obtained by measuring accelerations of wheels respectively having flat portions of different lengths. When the abruptly-increasing acceleration data is detected to produce the flat detection signal as mentioned above, the CPU 24 reads three acceleration data corresponding to the detected acceleration data from the three corresponding addresses of the areas L, M and N of the memory 25, and averages the three acceleration data. The CPU 24 then reads that flat length data which corresponds to the average of the above three acceleration data, from the data in the memory 25. This flat length data is applied through the I/O interface 17 to a display device 28 to display the length of the detected flat portion of the wheel. Thus, the length of the flat portion of the wheel can suitably be detected.

According to a modified form of the invention, the acceleration detector 11 is replaced by a noise detector for detecting a noise produced by the rolling of the wheel on the rail, the noise detector being mounted on the chassis of the train in the vicinity of the wheel. In this embodiment, the noise data fed from the analogue-to-digital converter 16 to the CPU 24 through the I/O interface 17 are processed in the manner as described in the preceding embodiment to produce a flat detection signal.

According to another modified form of the invention, the acceleration detector 11 is replaced by a stress detector for detecting a stress developing in the axle supporting the wheel. In this embodiment, the stress data fed from the analogue-to-digital converter 16 to the CPU 24 through the I/O interface 17 are processed in the manner as described in the preceding embodiments to produce a flat detection signal.

What is claimed is:

1. A system for detecting a flat portion of a peripheral surface of a wheel mounted on a vehicle in rolling engagement with a track rail, comprising:
    a. means mounted on the vehicle in the vicinity of the wheel for detecting vibrations of the wheel caused by the rolling of the wheel on the rail, and producing a first detection signal representative of the magnitude of the vibrations;
    b. rotation detecting means mounted on the vehicle for detecting the rotation of the wheel and producing a predetermined number of pulses for each rotation of the wheel;
    c. memory means having a plurality of storage areas, each having a plurality of memory locations equal in number to said pulses produced during one rotation of the wheel, said memory means further storing data representative of the relationship between the length of a flat portion and the vibration of the wheel;
    d. addressing means, responsive to said pulses, for addressing the memory locations of said memory means to sequentially store data corresponding to said first detection signal into said memory locations over said plural storage areas in accordance with the rotation of the wheel;
    e. means for comparing the data stored in said plurality of memory locations to detect a flat portion of the wheel when one of the data abruptly increases from the immediately-preceding data and when a difference between said one data and the data in the corresponding-disposed memory locations of the storage areas, other than the storage area in which the memory location storing said one data, is below a predetermined level; and
    f. flat length determination means responsive to said detection of a flat portion for reading the data in memory to determine the length of the wheel flat based on the data in memory and said one data.

* * * * *

UNITED STATES PATENT AND TRADEMARK OFFICE
CERTIFICATE OF CORRECTION

PATENT NO. : 4,696,446
DATED : September 29, 1987
INVENTOR(S) : Asahi Mochizuki, et al.

It is certified that error appears in the above-identified patent and that said Letters Patent is hereby corrected as shown below:

On the title page, adjacent the heading

"[75] Inventors:", "Kira" should read as --Akira--.

Signed and Sealed this

Twenty-fourth Day of May, 1988

Attest:

DONALD J. QUIGG

Attesting Officer

Commissioner of Patents and Trademarks